Jan. 1, 1924. 1,479,418

N. MININBERG

FOOD PRODUCT AND PROCESS OF MAKING THE SAME

Original Filed Feb. 20, 1922

Inventor
Nathan Mininberg by

Attorney

Patented Jan. 1, 1924.

1,479,418

UNITED STATES PATENT OFFICE.

NATHAN MININBERG, OF MINNEAPOLIS, MINNESOTA.

FOOD PRODUCT AND PROCESS OF MAKING THE SAME.

Application filed February 20, 1922, Serial No. 537,996. Renewed June 14, 1923.

*To all whom it may concern:*

Be it known that I, NATHAN MININBERG, a citizen of the United States, residing at Minneapolis, in the county of Hennepin and State of Minnesota, have invented certain new and useful Improvements in Food Products and Processes of Making the Same; and I do hereby declare the following to be a full, clear, and exact description of the invention, such as will enable others skilled in the art to which it appertains to make and use the same.

This invention relates to a food product and a process of producing the same, and has for its object to provide a product which will be especially high in vitamines, and a process for producing it which will not destroy said vitamines.

With these and other objects in view, the invention consists in the novel steps and combinations of steps constituting the process and in the novel product made by such process, all as will be more fully hereinafter disclosed and particularly pointed out in the claims.

Figure 1:
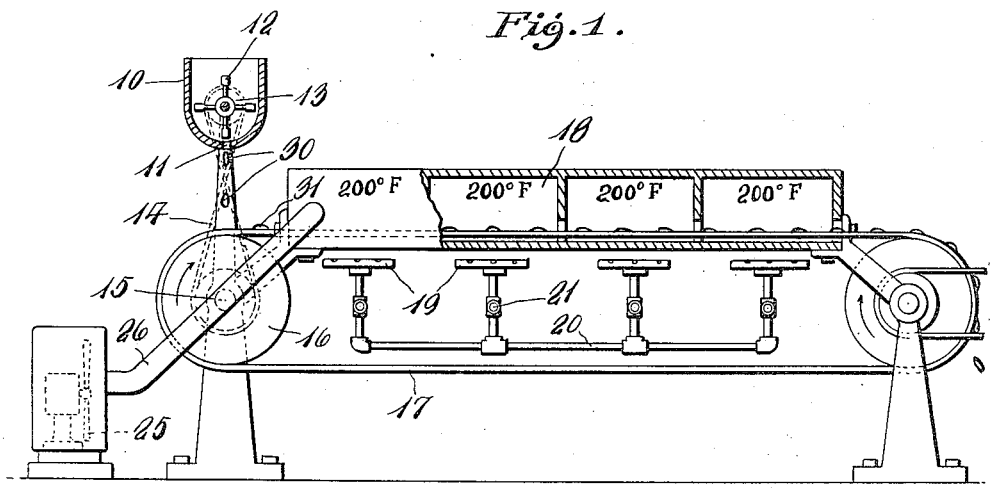
Figure 2:
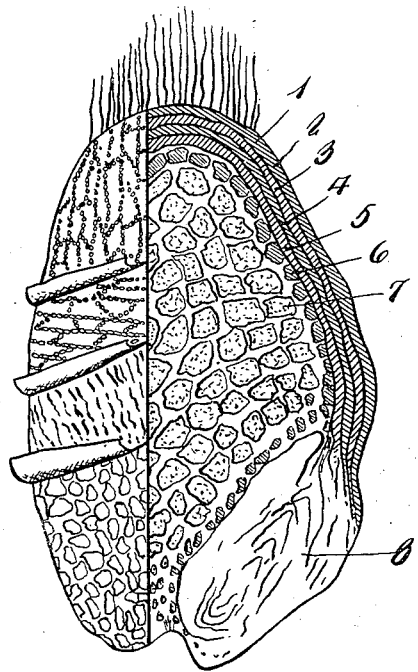

Referring to the accompanying drawings forming a part of this specification,

Figure 1 is a diagrammatic partially sectional view of an apparatus suitable for carrying out the process; and Figure 2 is a sectional view on an enlarged scale of a grain or kernel of wheat.

In order that the precise invention may be the more clearly understood, it is said: It is well known that a kernel or grain of wheat, for example, may be divided into outer layers such as those numbered 1, 2, 3, 4 and 5, and which contain the cellulose, the phosphorus and potassium, and the coloring matter present in the grain. The succeeding layer, such as 6, contains the gluten, and the next portion of the grain contains the starch or flour producing portion of the grain. It is further well known that the considerable portion 8 of the grain known as the embryo or wheat germ portion is the richest part of the kernel as regards vitamines, although each of the layers from 1 to 5 contains some vitamines in their raw state if they are not heated too highly. It is likewise well known that vitamines are readily destroyed by heat, and especially at temperatures above 212° F., the boiling point of water. Vitamines are not found at all in the starchy or white flour portions of the grain.

In carrying out this invention, the object is to supply a food that is rich in starchy or nourishing material and yet is also rich in vitamines. To accomplish this result, I separate out the starchy and glutinous portions of the grain from the embryo portion 8, and the vitamine carrying portions consisting of the layers 1 to 5. That is to say, I take a given amount of the whole grain, grind it carefully between cold rollers to prevent an undue heating of the product, and to a very fine degree of fineness. I then screen out the glutinous layer 6 and the starchy portion 7 of the grain from other portions thereof. I next boil, say, fifty parts by weight of water and add to it a sufficient amount of cooking soda to make it alkaline. I find in practice that the presence of soda accelerates the cooking of the starchy portion to some extent. I then take, say, 10½ parts by weight of the starchy and glutinous portions of the grain and add the same to the boiling water a little at a time, stirring all the while so as to make a smooth gelatinous mass. I allow this mixture to boil only for about a minute or a minute and a half, or until all the parts of the mixture are well blended. I then take five and a half parts by weight of the rest of the grain, consisting of the embryo portion 8 and the outer layers 1 to 5 and add it quickly and carefully to the mixture just produced, and in such a manner that each particle containing the vitamines may be deposited in the thin batter separately, so as to prevent lumping. It does not take longer than, say, thirty or forty seconds, time for this last step, and then the batter is taken from the stove and deposited in a dropper. This dropper consists of a suitable container 10, provided with a discharge orifice 11 and having a suitable stirrer 12 driven by a pulley 13, from a belt 14 operated from a motor shaft 15, on which is mounted a pulley 16, driving a conveyer belt 17 through a plurality of chambers 18, each heated to a temperature of substantially 200° F., but below the boiling point of water. Suitable burners 17 fed from a gas supply pipe 20 and provided with cocks 21, may be employed to maintain the temperature of the chambers 18. Further, a fan 25 is preferably employed to blow hot air through the pipe 26 into said chambers 18 in order to maintain an equitable temperature and to reach all particles of the food product without unduly heating those carrying the vitamines.

The batter being of the consistency of cream, the same is placed in the container 10 and the stirrer 12 is set going. The batter is thus delivered through the opening 11 in small portions or drops 30 which reach the conveyer belt 17 in the form of flakes or puffs 31, which are more or less permeated with air during their descent from the opening 11 to said conveyer belt 17.

Up to this point the vitamine carrying portions of the grain have not been subjected to a temperature sufficiently high to destroy their valuable properties. And as the temperature in the oven 18 is not sufficiently high to destroy said vitamines, the result is a very quick drying of the puffs or flakes by means of the hot air blast to which they are subjected. In other words, it is found in actual practice that the heating of the material is sufficient to preserve the food indefinitely to enable it to be readily digested in the stomach, and at the same time to preserve the valuable vitamine properties which are possessed by the food in its raw state.

The height from which the batter is dropped seems to exercise an important function, the reason for which I cannot satisfactorily explain, but I find it to be a fact that if the portions 30 are dropped from a height of about eighteen inches from the belt, the flakes are of a better flavor and therefore more palatable, than if this height is made greater. There may be some difference in the amount of air absorbed in the case when an eighteen inch height is adopted from that absorbed when a greater height is adopted and the final shape of the flakes may have something to do with it. That is to say, with the consistency of the batter produced from the proportions just stated, the flakes are more or less misshapen when they reach the belt 17 from a height higher than 18 inches and this may influence their drying qualities as well as their flavor. It is a fact, however, that by proceeding as above, I am enabled to produce a nutritious and most palatable product from the whole wheat and which is unusually high in vitamine constituents. I find that I am not limited to wheat in carrying out this process, and in making this product, because I find that oats, barley, rice, etc., may be substituted for wheat with the same class of results.

It is obvious that those skilled in the art may vary the details of the procedure as well as the form of apparatus without departing from the spirit of the invention, and therefore I do not wish to be limited to the above disclosure except as may be required by the claims.

What I claim is:

1. The process of making a food product rich in vitamines from the whole grain, which consists in segregating the starchy portions of said grain from the vitamine carrying portions; cooking said starchy portions sufficiently to preserve them; adding the uncooked vitamine carrying portions to the cooked starchy portions; and drying the mixture at a temperature too low to destroy the vitamines present, substantially as described.

2. The process of making a food product from whole grain without destroying the vitamines present, which consists in grinding said grain to a fine state of subdivision; separating the starchy or non-vitamine carrying portions; boiling said starchy portions for a predetermined time in water; adding the vitamine portions to said starchy portions; stopping the boiling operation before the vitamines present are destroyed; dropping the batter thus produced through air; and heating and drying the same at a temperature below 212° F., substantially as described.

3. The herein described new food product consisting of the cooked starchy portions of whole grains admixed with the uncooked vitamine carrying portions of said grains, the whole being in a dry state, substantially as described.

In testimony whereof I affix my signature.

NATHAN MININBERG.